United States Patent
Peters et al.

(10) Patent No.: US 10,812,639 B1
(45) Date of Patent: Oct. 20, 2020

(54) PRESSURE CHAMBER AND ASSOCIATED PRESSURE SENSORS FOR A MOBILE COMMUNICATION DEVICE

(71) Applicant: Robert Bosch GmbH, Stuttgart (DE)

(72) Inventors: Christian Peters, Mountain View, CA (US); Seow Yuen Yee, Mountain View, CA (US); Thomas Rocznik, Mountain View, CA (US); Ning Wang, Sunnyvale, CA (US); Timothy Schultz, Sunnyvale, CA (US)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 16/717,992

(22) Filed: Dec. 17, 2019

(51) Int. Cl.
| | |
|---|---|
| *G06F 3/041* | (2006.01) |
| *G06F 1/16* | (2006.01) |
| *G06F 3/0354* | (2013.01) |
| *H04M 1/02* | (2006.01) |
| *G01L 19/04* | (2006.01) |
| *G01L 5/00* | (2006.01) |
| *G01L 11/00* | (2006.01) |

(52) U.S. Cl.
CPC ........... *H04M 1/026* (2013.01); *G01L 5/0052* (2013.01); *G01L 11/00* (2013.01); *G01L 19/04* (2013.01); *H04M 2250/12* (2013.01)

(58) Field of Classification Search
None
See application file for complete search history.

(56) References Cited

U.S. PATENT DOCUMENTS

| | | | |
|---|---|---|---|
| 7,499,040 B2 | 3/2009 | Zadesky et al. | |
| 7,554,167 B2* | 6/2009 | Vaganov | G06F 3/0338 257/415 |
| 8,350,345 B2* | 1/2013 | Vaganov | G06F 3/0338 257/415 |
| 8,823,887 B2* | 9/2014 | Park | G06F 3/041 345/173 |
| 9,203,951 B1 | 12/2015 | Kritt et al. | |
| 9,411,511 B1 | 8/2016 | Sivertsen | |
| 9,762,236 B2 | 9/2017 | Chen et al. | |
| 10,353,507 B2* | 7/2019 | Suzuki | G06F 3/0416 |

(Continued)

FOREIGN PATENT DOCUMENTS

| | | |
|---|---|---|
| CN | 206039370 U | 3/2017 |
| CN | 106919292 A | 7/2017 |

(Continued)

*Primary Examiner* — Tuan A Tran
(74) *Attorney, Agent, or Firm* — Brooks Kushman P.C.

(57) ABSTRACT

A mobile communication device and associated control system is provided for determining a presence and location of pressure applied to the mobile communication device. The system can replace physical buttons on the mobile communication device. In embodiments, a sealed chamber, such as a tube, is filled with a pressure-transferring medium inside the sidewalls of the frame of the mobile communication device. Two (or more) pressure sensors can be mounted to the chamber to measure the pressure at two different locations in the chamber. In an embodiment, the time difference of the pressure wave arriving between the pressure sensors can indicate the location of the applied force. By knowing where the force is applied, a desired command from a user can be inferred.

20 Claims, 5 Drawing Sheets

(56) References Cited

U.S. PATENT DOCUMENTS

| | | | |
|---|---|---|---|
| 10,379,654 B2* | 8/2019 | Li | G01L 1/18 |
| 10,423,253 B2* | 9/2019 | Ho | G06F 3/0416 |
| 10,488,997 B2* | 11/2019 | Takada | G02B 6/0055 |
| 10,509,512 B2* | 12/2019 | Kikuchi | G06F 3/0425 |
| 10,514,797 B2* | 12/2019 | Kugler | G06F 3/0414 |
| 10,585,522 B2* | 3/2020 | Lynn | G06F 3/0412 |
| 10,635,255 B2* | 4/2020 | Kugler | G06F 1/1656 |
| 10,671,167 B2* | 6/2020 | Hajati | G06F 3/016 |
| 2004/0159535 A1 | 8/2004 | Wagner | |
| 2005/0052425 A1 | 3/2005 | Zadesky et al. | |
| 2005/0184953 A1* | 8/2005 | Camp, Jr. | G06F 3/0338 345/156 |
| 2005/0190152 A1 | 9/2005 | Vaganov | |
| 2006/0197750 A1 | 9/2006 | Kerr et al. | |
| 2007/0242037 A1* | 10/2007 | Son | G06F 3/044 345/156 |
| 2009/0140996 A1* | 6/2009 | Takashima | G06F 3/0416 345/173 |
| 2010/0085325 A1 | 4/2010 | King-Smith et al. | |
| 2010/0141410 A1 | 6/2010 | Aono et al. | |
| 2010/0156245 A1 | 6/2010 | Barta et al. | |
| 2012/0032905 A1 | 2/2012 | Koshiyama et al. | |
| 2013/0154948 A1 | 6/2013 | Schediwy et al. | |
| 2014/0028602 A1 | 1/2014 | Morinaga et al. | |
| 2014/0028604 A1 | 1/2014 | Morinaga et al. | |
| 2014/0160641 A1 | 6/2014 | Chuang et al. | |
| 2014/0230575 A1 | 8/2014 | Picciotto et al. | |
| 2014/0334077 A1 | 11/2014 | Kwong | |
| 2015/0002450 A1 | 1/2015 | Lewis et al. | |
| 2015/0123889 A1 | 5/2015 | Willis et al. | |
| 2015/0138106 A1 | 5/2015 | Nishimiya et al. | |
| 2015/0145805 A1 | 5/2015 | Liu | |
| 2015/0160770 A1 | 6/2015 | Stewart et al. | |
| 2015/0169100 A1 | 6/2015 | Tsuyuki et al. | |
| 2016/0048668 A1 | 2/2016 | Zafiris | |
| 2016/0147355 A1* | 5/2016 | Kano | G06F 3/0412 345/174 |
| 2016/0162093 A1* | 6/2016 | Kim | G06F 3/0412 345/174 |
| 2016/0179276 A1 | 6/2016 | Nathan et al. | |
| 2016/0188006 A1 | 6/2016 | Han et al. | |
| 2016/0196421 A1 | 7/2016 | Kitada et al. | |
| 2016/0225568 A1 | 8/2016 | Chen et al. | |
| 2016/0238433 A1 | 8/2016 | Kuo et al. | |
| 2016/0246396 A1 | 8/2016 | Dickinson et al. | |
| 2016/0246413 A1 | 8/2016 | Kano et al. | |
| 2016/0259458 A1 | 9/2016 | Johansson et al. | |
| 2016/0283035 A1 | 9/2016 | Sandblad et al. | |
| 2016/0328079 A1 | 11/2016 | Schwartz et al. | |
| 2016/0358737 A1 | 12/2016 | Brooks et al. | |
| 2017/0038877 A1 | 2/2017 | Kuboyama et al. | |
| 2017/0177152 A1 | 6/2017 | Sato et al. | |
| 2017/0199624 A1 | 7/2017 | Nathan et al. | |
| 2017/0235398 A1 | 8/2017 | Choi et al. | |
| 2017/0280393 A1 | 9/2017 | Suo | |
| 2017/0316243 A1 | 11/2017 | Ghavanini | |
| 2017/0336970 A1 | 11/2017 | Kim et al. | |
| 2018/0059871 A1 | 3/2018 | Fukushima | |
| 2018/0074636 A1 | 3/2018 | Lee et al. | |
| 2018/0129355 A1 | 5/2018 | Lynn et al. | |
| 2018/0136770 A1 | 5/2018 | Kwong et al. | |
| 2018/0136776 A1 | 5/2018 | Xie | |
| 2018/0164937 A1 | 6/2018 | Lynn et al. | |
| 2018/0181260 A1 | 6/2018 | Kikuchi | |
| 2018/0188874 A1* | 7/2018 | Cho | G01L 1/205 |
| 2018/0225030 A1* | 8/2018 | Szeto | G06F 3/0482 |
| 2018/0246612 A1 | 8/2018 | Lynn et al. | |
| 2018/0292938 A1 | 10/2018 | Karlo et al. | |
| 2018/0299996 A1 | 10/2018 | Kugler et al. | |
| 2018/0300004 A1 | 10/2018 | Kugler et al. | |
| 2018/0307339 A1 | 10/2018 | Ho et al. | |

FOREIGN PATENT DOCUMENTS

| | | |
|---|---|---|
| EP | 2685358 A1 | 1/2014 |
| KR | 20130106503 A | 9/2013 |
| KR | 20130106956 A | 10/2013 |
| WO | 2018016906 A1 | 1/2018 |
| WO | 2018080115 A1 | 5/2018 |
| WO | 2019023309 A1 | 1/2019 |

* cited by examiner

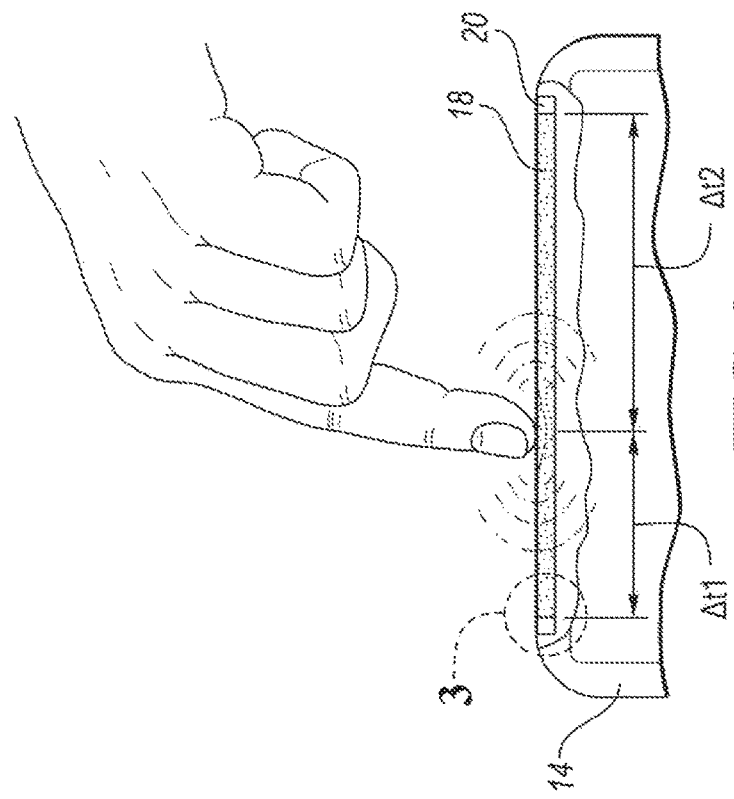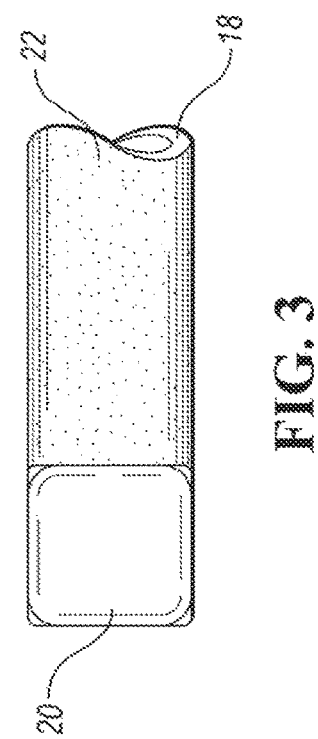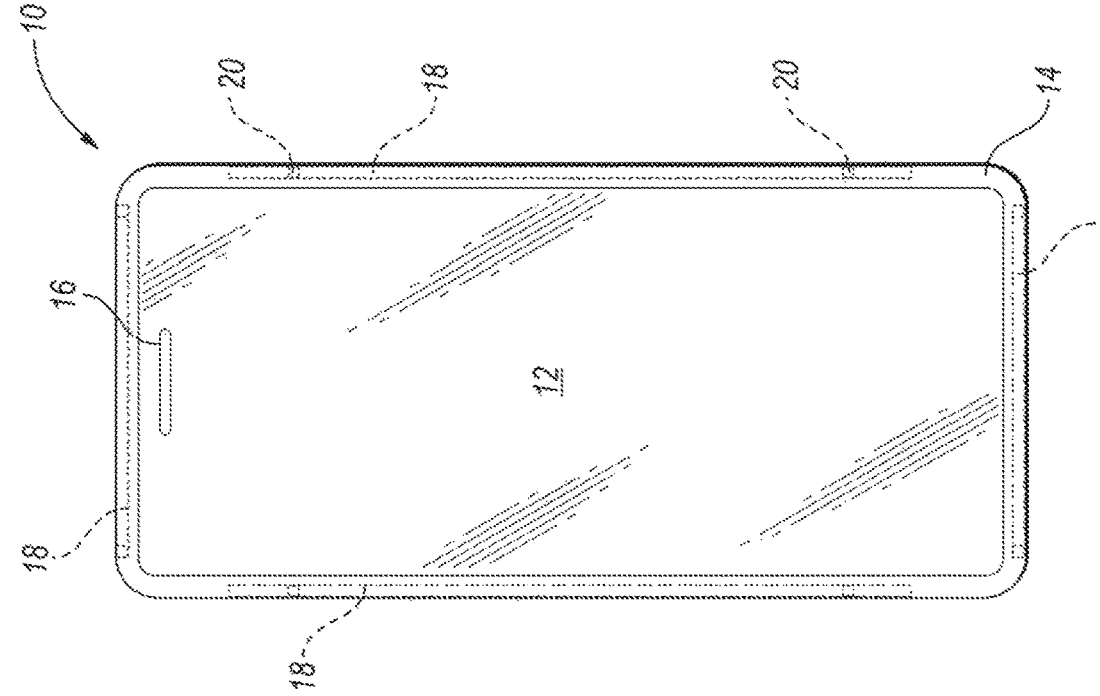

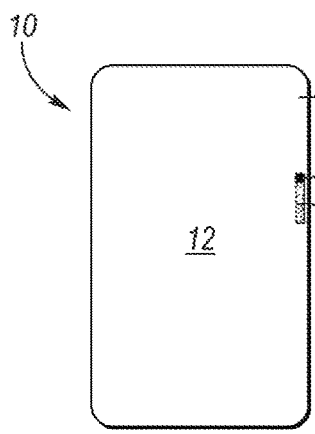
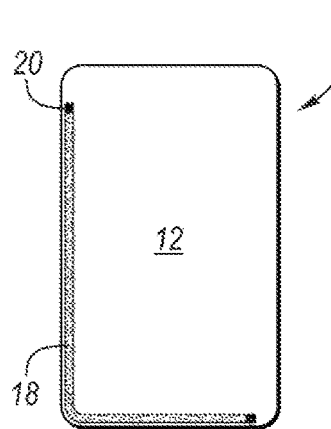
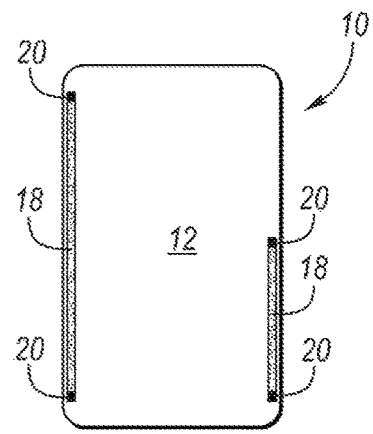
FIG. 6A   FIG. 6B   FIG. 6C
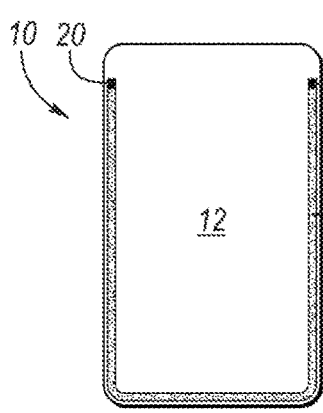
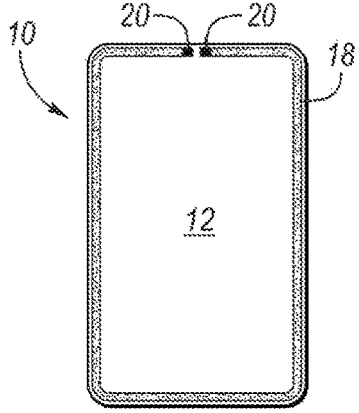
FIG. 6D   FIG. 6E
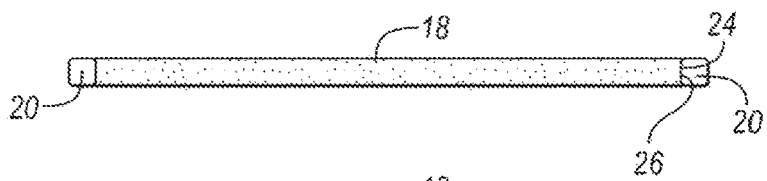
FIG. 7A
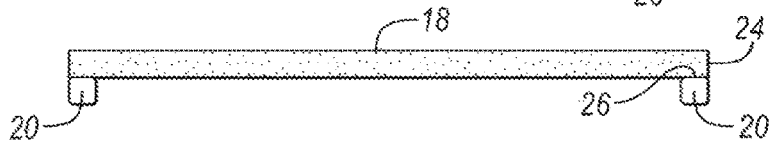
FIG. 7B
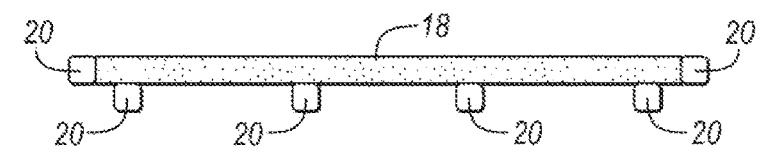
FIG. 7C
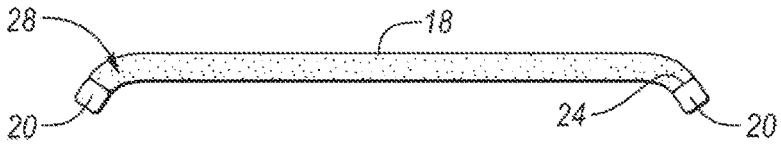
FIG. 7D

PRESSURE CHAMBER AND ASSOCIATED PRESSURE SENSORS FOR A MOBILE COMMUNICATION DEVICE

TECHNICAL FIELD

The present disclosure relates to a system for determining a location of a force exerted on a frame of a mobile communication device. In embodiments, the frame of the mobile communication device has a chamber containing a medium, and pressure sensors configured to detect an increase in pressure in the medium, enabling a determination of a precise location of the force exerted on the chamber.

BACKGROUND

Mobile communication devices such as smartphones typically have three push-buttons on an outside wall of a frame of the device—one button to turn the device (or its screen) on and off, another button to increase the audio volume, and another button to decrease the audio volume. These buttons are located in a fixed position on the mobile communication device, and their location can vary by make or model.

SUMMARY

In one embodiment, a system of determining a location of a force exerted on a mobile communication device is provided. The system includes a tube containing a fluid medium, the tube configured to attach to a mobile communication device about at least a portion of a perimeter of a frame of the mobile communication device; a first pressure sensor disposed along the tube and configured to detect pressure in the fluid medium; a second pressure sensor disposed along the tube and configured to detect pressure in the fluid medium; and a processor coupled to the first and second pressure sensors and configured to determine a location of a force exerted on the tube based on a time between the first and second pressure sensors detecting a pressure increase in the fluid medium.

In another embodiment, a mobile communication device includes a frame; a sealed chamber disposed within the frame, the chamber containing a fluid medium configured to transfer pressure through the chamber in response to an external force exerted on the chamber; first and second pressure sensors disposed along the chamber and configured to detect fluid pressure in the fluid medium; and a processor configured to determine a location of the external force exerted on the chamber based on a time between (i) the first pressure sensor detecting an increase in the fluid pressure and (ii) the second pressure sensor detecting the increase in the fluid pressure.

In another embodiment, a system of determining a location of a force exerted on a mobile communication device is provided. The system includes a tube encapsulating a fluid medium, the tube configured to attach to a frame of a mobile communication device; and first and second pressure sensors disposed along the tube and configured to detect pressure in the fluid medium. The first and second pressure sensors are operable to output respective first and second pressure signals indicative of pressure in the fluid medium, and wherein a difference in time between pressure increases in the first and second pressure signals indicates a location where a force is exerted on the tube

BRIEF DESCRIPTION OF THE DRAWINGS

FIG. 1 is a top plan view of a mobile communication device configured to detect a force exerted on a surface thereof via a pressure tube containing a fluid medium, according to one embodiment.

FIG. 2 is a cross-sectional plan view of a portion of the mobile communication device with a force being exerted on a surface thereof, according to one embodiment.

FIG. 3 is an enlarged view of a portion of FIG. 2, according to one embodiment.

FIGS. 6A-6E illustrate top cross-sectional plan views of mobile communication devices having various configurations of pressure tubes, according to various embodiments.

FIGS. 7A-7D illustrate cross-sectional plan views of various configurations of pressure tubes, according to various embodiments.

DETAILED DESCRIPTION

Figure 4A:
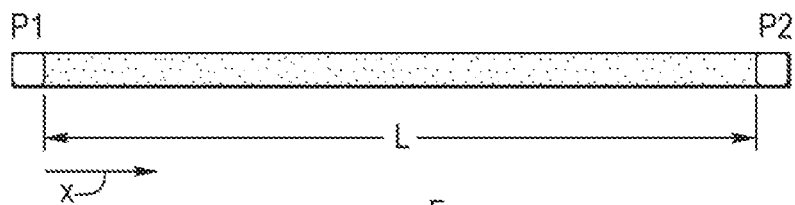
FIG. 4A is a cross-sectional plan view of a pressure tube in communication with pressure sensors, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In this disclosure, including the definitions below, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured, upon execution by the processor, to cause the controller to increase or decrease volume controls of a mobile communication device, turn on or off a vibration mode, turn on or off a viewing screen of the mobile communication device, and other similar actions that are typically commanded in response to a depression of a physical button residing on the edge of a frame of the mobile communication device.

This disclosure also makes reference to mobile communication devices. It is intended that the term "mobile communication device," or similar phrases such as "mobile device," shall include personal communication devices such as smart phones, cellular phones, tablets, pagers, wearable devices such as smart watches, and other such devices having wireless network connectivity.

Mobile communication devices such as smartphones or tablets typically have three push buttons on an outside wall of a frame of the mobile communication device—one button to turn the device (or its screen) on and off, another button to increase the audio volume, and another button to decrease the audio volume. Other such buttons are also common, such as a toggle switch that turns a vibrate function on and off. These buttons have several drawbacks. For instance, these buttons have design limitations due to the mechanical presence of the buttons. The buttons might be constrained to be in a particular location or of a particular size due to the packaging space necessary for such a button. Also, milling and/or drilling of the frame of the phone is typically required to create an opening for the push button. This process can be a substantial cost factor for mobile communication device OEMs. Moreover, the holes made in the frame for the button reduces the water resistance and increases the likelihood of dust collection within the mobile communication device.

According to various embodiments described below, a mobile communication device is provided with a sealed chamber, such as a bladder or tube, filled with a pressure-transferring medium inside the sidewall of the frame of the mobile communication device. The chamber can have one or more pressure sensors attached thereto to measure the pressure of the medium inside the chamber. If a user applies force to the outer frame of the mobile communication device, the chamber will get deformed and a pressure wave will be sent out from where the force is applied. The pressure increase sensed by the pressure sensor can detect a desired event (e.g., a desire to turn on the phone). Likewise, multiple pressure sensors can be utilized to determine a precise location in which the pressure increase originated from, and therefore the location in which the user applied the force. For example, two (or more) pressure sensors can be mounted to the chamber to measure the pressure at two different locations in the chamber. In an embodiment, the time difference of the arriving pressure wave between the pressure sensors can indicate the location of the applied force. By knowing where the force is applied, a desired command from a user can be inferred. For example, if the applied force is determined to be in a location designated as a volume-increase region, the mobile communication device can react to the detected applied force by increasing the volume of the mobile communication device.

This also allows for customization of the corresponding actions depending on the location of the applied force. For example, a user of the mobile communication device can designate a first region of the mobile device as the volume-up region, such that pressure applied to the chamber in that first region causes the volume of the mobile device to increase; the user can also designate a second region of the mobile device as the volume-down region, such that pressure applied to the chamber in that second region causes the volume to decrease. The user can customize the size and location of each of the first and second regions, allowing the user to fully customize where the activation regions should be located, and what corresponding action is performed by the mobile device when pressure is applied to each activation region. This system can replace physical buttons on the mobile communication device, thus providing a mobile communication device with no physical, depressible or switchable buttons, and only relying on pressure applied on the mobile communication device to issue various commands that are normally issued based on button presses.

Referring to FIG. 1, a mobile communication device 10 is illustrated. The mobile communication device 10 has a front surface 12, and an opposing rear surface. The front surface 12 can be a touch screen configured for viewing information thereon while also enabling a user to select items on the screen such as applications ("apps") and the like. The mobile communication device 10 also includes a frame 14. The frame 14 can be metal (e.g., aluminum, titanium, etc.) that creates a "skeleton" of the mobile communication device 10. The frame 14 may also include the outer surface of the mobile communication device 10, or can be internal to the outer surface of the mobile communication device 10. One or more apertures 16 may be provided in the frame 14. The apertures 16 may be located at various locations and be provided for speakers, power connections, headphone connections, and the like.

One or more chambers may be provided in the mobile communication device 10. In the illustrated embodiment of FIG. 1, the chambers are configured in the form of tubes 18, also referred to as pressure tubes or fluid pressure tubes. While the chambers are shown as tubes in this embodiment, certainly the chambers can be other sizes, shapes, and configurations. The tubes 18 are hollow, tubular, sealed members that contain or house a fluid medium therein. The tubes 18 can be cylindrical (rectangular cylinder, circular cylinder, etc.) or other elongated shape. The tubes 18 can each be a singular tube with one wall containing fluid medium therein, but can also include multiple parallel chambers that create subtubes, in which each subtube is connected to one or more dedicated pressure sensors. In one embodiment, one or more surfaces of the tube 18 can be the frame 14 itself.

Each tube 18 can have one or more pressure sensors 20 attached to the tube 18 and configured to measure the fluid pressure of the fluid medium within the tube 18. The pressure sensors 20 can be any type of sensor which can measure a pressure and/or pressure change with a sufficient resolution and sample frequency. For example, the pressure sensors 20 can be a BMP388 by BOSCH SENSORTEC. If a user applies a force to the outside surface of the mobile communication device 10 where one of the tubes 18 is located, that tube 18 will deform and a pressure wave will be sent out within the fluid medium from where the force is applied. The one or more pressure sensors 20 are configured to detect the pressure or change in pressure in the fluid medium resulting from the applied force on the outside surface of the mobile communication device 10. An associated controller can be coupled to the one or more pressure sensors 20 and can command an action in response to the detected force application.

The tubes 18 may be located along one or more edges of the frame 14 of the mobile communication device 10. For example, one tube 18 may be located along the top (e.g., above aperture 16), one along the bottom edge, one along the left edge, and another along the right edge. In another embodiment, only one tube 18 is provided along only a single edge of the frame 14. Providing tubes 18 along various edges of the mobile communication device 10 allows for an increased customization of activation regions, as will be described later. To maximize the pressure signal output by the sensor 20, the side of the tube 18 facing away from the force input may be fixed to the frame 14. This assures that the side of the tube 18 facing away from the force input is fixed and does not move when the opposing side facing the force input is deformed due to the force input.

In one embodiment, one or more of the pressure sensors 20 are provided for each tube 18, and are used to detect an event. For example, the controller can be configured to increase the volume if the pressure sensor(s) 20 in the tube 18 on the right edge is depressed, and configured to decrease the volume if the pressure sensor(s) 20 in the tube on the left edge is depressed. One pressure sensor 20 per tube may be the appropriate amount of pressure sensors for this embodiment.

In a more advanced embodiment, two or more pressure sensors 20 are coupled to each individual tube 18, enabling the controller to determine a location of the source of the external force (e.g., where the user pressed the mobile communication device 10.) For example, FIGS. 2-3 illustrate an embodiment in which an external force is provided to the mobile communication device 10 by a user at a location along the tube 18. The time difference of the arriving pressure wave can be measured. In particular, as a pressure wave is generated in the fluid medium 22 within the tube 18, the amount of time between the sensors 20 detecting the pressure increase can determine the location of the applied force.

The fluid medium 22 in the tube 18 can be gas (e.g., air), liquid (e.g., mineral oil), or solid (e.g., gel). Different fluid mediums affect and influence the speed of the pressure wave, and therefore the type of fluid medium utilized should be known for proper calculations by the controller. If a liquid is used, it may be a non-conductive liquid.

The frame 14 and the tube 18 may be configured with varying thickness and material usage to facilitate proper deformation of the tube 18 when pressed by a user. For example, in one embodiment, the sidewall of the frame where the tube 18 is located can have a first thickness in a region where the sidewall of the frame overlaps or covers the tube 18, and a second thickness in another region where the sidewall of the frame does not overlap the chamber. The second thickness can exceed the first thickness, such that a thinner frame is provided in a region that covers the tube 18.

In another embodiment, one or more walls of the tube 18 can be made of a different or modified material in regions where the wall is meant to deform in response to the external force. For example, a wall of the tube 18 that faces the outer edge of the mobile communication device 10 may be made of a material that is more flexible than the other walls of the tube 18. The relative flexibility of the walls of the tube 18 can allow flex of the wall that is deformed due to the external force relative to the other walls of the tube 18. In some embodiments where this feature is not provided, the entire tube 18 may bend in response to the external force without creating a pressure wave exceeding a corresponding threshold to trigger an action in the mobile communication device 10.

While FIG. 3 shows the sensor 20 being at an end of the tube 18, the sensor 20 can also be disposed inside the tube 18. At least some or all of the sensor 20 can be surrounded by the fluid medium in the tube 18.

Figure 4B:
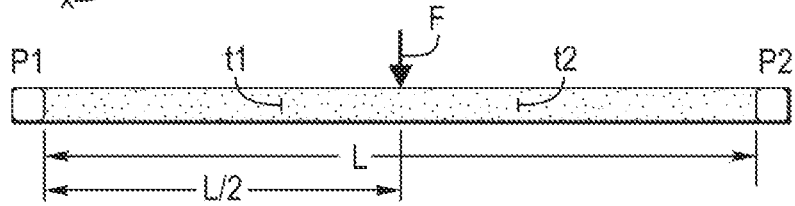
FIG. 4B is a cross-sectional plan view of the pressure tube with a force being applied to the pressure tube at a location halfway between the two pressure sensors, according to one embodiment.
Figure 4C:
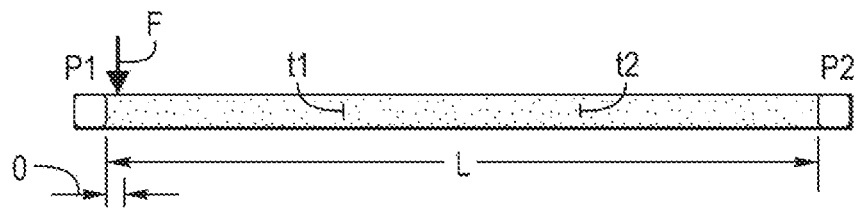
FIG. 4C is a cross-sectional plan view of the pressure tube with a force being applied to the pressure tube at a location closer to one of the pressure sensors, according to one embodiment.

FIGS. 4A-4B illustrate schematic embodiments of determining a location of an external force (represented by "F") placed on the frame 14 of the mobile communication device 10. The pressure tube 18 is provided with two pressure sensors 20, namely P1 and P2. The pressure sensors P1 and P2 are located are located at opposite ends of the tube 18. A distance between both pressure sensors P1 and P2 is known, and is represented by length L. If an event is applied exactly in the center of the tube 18 at a center point (L/2) between the two pressure sensors P1 and P2, then the two pressure sensors P1 and P2 detect an increase in fluid pressure in the tube 18 at the same time. Therefore, the amount of time between the sensors 20 detecting the pressure increase is zero.

A distance between one of the pressure sensors (e.g., P1) and the applied force F can be a function of time t after the force F is applied (or time between the sensors detecting the force, as explained below), and the temperature T of the fluid medium:

$$s(t,T)=v(T)*t$$

where the velocity of the pressure wave in the fluid medium is represented by v. In one embodiment, the controller can access a lookup table stored in memory. The lookup table may look to the temperature T of the fluid medium as well as the time (t, Δt) between the signals being received at the pressure sensors to determine a proper location of the origination of the external force F.

Since the start time of the application of the force F may not be known, the time difference of the arriving wave can be analyzed. The time between the two pressure sensors P1 and P2 detecting a pressure increase can be represented as follows:

$$\Delta t=t1-t2$$

where t is time, t1 is the time the first pressure sensor P1 receives a signal indicating the pressure increase, and t2 is the time the second pressure sensor P2 receives a signal indicating the pressure increase.

The maximum time difference Δt occurs in a situation in which the external force is applied directly on one of the pressure sensors P1 or P2, and thus x=0 or x=L. The function of the time difference and the location of the external force is linear; as Δt goes positive, the inferred location is closer to the second pressure sensor P2; as Δt goes negative, the inferred location is closer to the first pressure sensor P1; and if Δt is zero, the location of the external force is halfway between the sensors P1 and P2.

The determined difference in time Δt between the pressure sensors P1, P2 detecting the increase in fluid pressure can be affected by the temperature T of the fluid medium (e.g., the greater the temperature T, the greater the velocity v of the pressure wave). Therefore, in one embodiment, one or more temperature sensors may be provided in fluid communication with the fluid medium 22 in the tube 18. The temperature sensors can communicate with the controller so that the controller can make temperature compensation. In one embodiment, the controller can communicate with a lookup table that applies a compensation factor to the determined time difference Δt.

In one embodiment, more than two pressure sensors 20 can be provided for each tube 18. This can enable a more accurate determination of the velocity v of the pressure wave. For example, if the pressure wave passes a first pressure sensor at a known location x1, and a second pressure sensor at a known location x2, then after $t_{x2-x1}$ seconds the velocity can be calculated using the following:

$$v = \frac{x2 - x1}{t_{x2-x1}}$$

The calculated velocity v can then be used to determine the location of the external force F. Using this approach may remove the need for a temperature sensor, as the pressure wave will be detected as passing through multiple pressure sensors.

Figure 5:
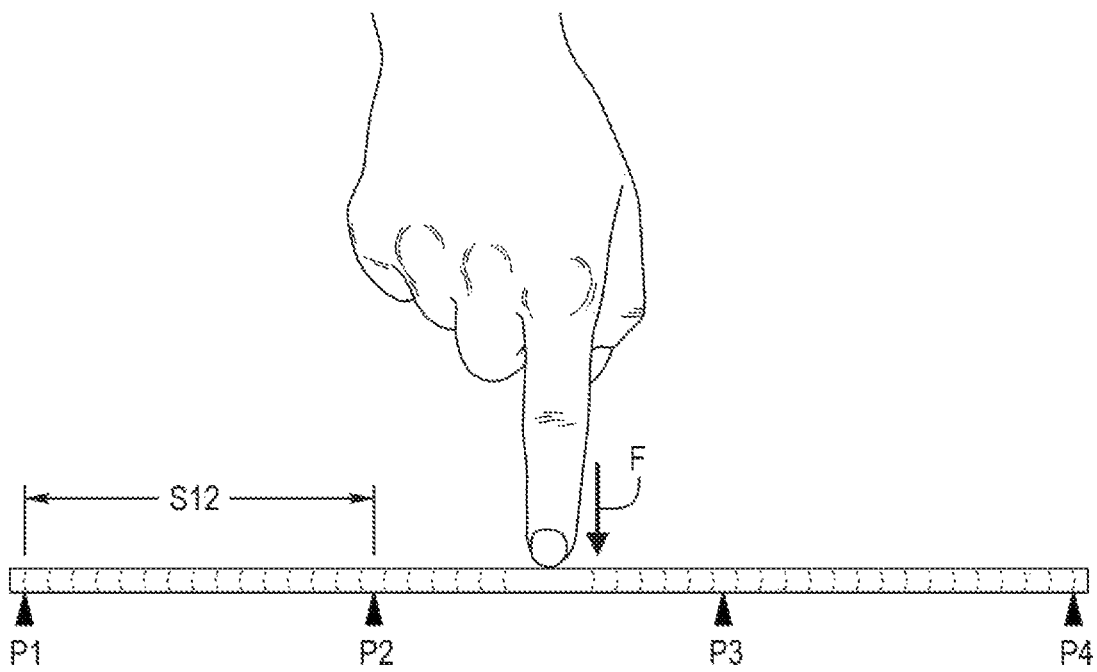
FIG. 5 illustrates a schematic view of a pressure tube with pressure waves in the fluid medium within the pressure tube as a result of an external force, according to one embodiment.

For example, FIG. 5 illustrates one embodiment of velocity calculation in a tube 18 provided with four pressure sensors P1, P2, P3, P4 along the tube 18. An external force F is placed on the tube 18, generating a pressure wave traveling along the pressure tube 18. The pressure wave velocity v can be calculated based on the travel time t between sensors P2 and P1, along with the distance between the two sensors S12, which is known and can be preprogrammed into the memory associated with the controller. The determined pressure wave velocity can be determined as follows:

$$v21 = \frac{S21}{t21}$$

where v21 is the velocity of the pressure wave in the tube between the second pressure sensor P2 and the first pressure sensor P1, S21 is the distance from pressure sensor P2 to pressure sensor P1, and t21 is the amount of time between the pressure sensor P2 sensing the pressure wave and the pressure sensor P1 sensing the pressure wave. Assuming the fluid medium 22 has consistent properties throughout the tube 18, the velocity of the pressure wave is the same throughout the tube 18. The same calculation can be made for the pressure wave between the third pressure sensor P3 and the fourth pressure sensor P4, and the results can be averaged to reduce noise and increase the accuracy of the determined velocity v.

FIGS. 6A-6E illustrate various configurations of the tube 18 and associated pressure sensors 20. While these views are from a top view of the front surface 12, it should be understood that the tubes 18 are located at the side edge of the frame 14, and a small amount of thickness of frame 14 can be present between the side edge of the frame 14 and the tube 18 itself.

In FIG. 6A, the tube 18 is relatively short and is located at a particular, localized region of the edge of the frame 14 of the mobile communication device 10. The shortened, localized tube 18 in this embodiment may only include one pressure sensor 20, since the location of the external force can be known by the position of the tube 18 relative to the frame 14. In other words, with a shortened tube 18 like in FIG. 6A, any pressure applied to the tube 18 and sensed by the sensor 20 can indicate that the external force was provided at a location somewhere along the tube 18, and since the tube is shortened, any more accuracy as to the precise location may not be necessary. In application, one shortened tube 18 and an associated pressure sensor 20 may be present for each desired location along the frame 14 in which a button location is desired. For example, one tube 18 and sensor 20 can be placed in a location on the frame 14 such that pressure provided at that portion of the side edge of the frame 14 can cause the controller to increase the volume; another tube 18 and sensor 20 can be placed in another location such that pressure provided at the portion of the side edge of the frame 14 can cause the controller to decrease the volume. Any number of tubes 18 with a single sensor can be placed in various locations about the mobile communication device 10 such that pressure provided on that particular tube 18 can cause a respective action by the controller (e.g., volume up, volume down, power off, power on, screen off, screen on, vibration on, vibration off, etc.)

FIG. 6B illustrates the tube 18 in an L-shape, extending along the edge of the frame 14 and wrapping around a corner of the mobile communication device 10. This enables pressure provided along any portion of the frame 14 along this L-shaped path to cause a corresponding action by the controller.

FIG. 6C illustrates two tubes 18, one on either side edge of the mobile device 10. One of the tubes is longer than the other. This enables a larger area for detecting pressure at one side edge of the frame 14 than the opposing side edge of the frame 14. This embodiment can apply for a mobile communication device 10 with more desired buttons or functions on one side edge than the other. For example, it may be desirable to have a volume-up, volume-down, and vibration feature on the left-side edge of the mobile communication device 10, and only a power on/off feature on the right-side edge of the mobile communication device 10. Providing a greater area for the tube 18 on the left-side edge allows larger designated areas for all three features associated with pressure provided to that tube 18.

FIG. 6D illustrates one embodiment in which the tube 18 is U-shaped, extending along each side edge of the frame 14 and along the bottom edge of the frame 14. This enables pressure provided along any portion of the edges of the frame 14 along this U-shaped path to cause a corresponding action by the controller.

FIG. 6E illustrates one embodiment of the mobile communication device 10 in which the tube 18 encircles or surrounds the edges of the frame 14, creating a circular, rectangular, or O-shape. This enables pressure provided along any portion of the edges of the frame 14 to cause a corresponding action by the controller.

FIGS. 7A-7D illustrate various configurations and locations of the pressure sensors 20 within an associated pressure tube 18. In FIG. 7A, the pressure sensors 20 are mounted at the longitudinal ends 24 of the tube 18. The sensor surface 26 of each sensor 20 is parallel to the endings of the tube 18. In other words, the sensor surface 26 of each sensor 20 is directly in-line and coupled to the longitudinal end 24 of the tube. The end of the tube 18 can be sized to match the size of the sensor surface 26. FIG. 7B illustrates an embodiment in which the sensor surface 26 of each sensor 20 is oriented 90 degrees relative to the longitudinal end 24 of the tube 18. FIG. 7C illustrates an embodiment in which six different sensors 26 are provided along the tube 18. A pair of the sensors 20 are provided with their sensor surface 26 facing the longitudinal ends 24 of the tube 18, while the remaining sensors 20 have their sensor surface oriented 90 degrees relative to the ends 24 of the tube, facing the elongated edges of the tube 18. In another embodiment not shown herein, one or more of the sensors of FIG. 7C located along the elongated edge of the tube 18 can be a temperature sensor. FIG. 7D illustrates an embodiment in which the tube 18 can be bent at its ends 24. In other words, opposing end regions 28 of the tube 18 can be bent inwardly toward a center of the mobile communication device 10. This creates a system in which the sensor surface 26 of each sensor 20 is facing outwardly, away from the center of the mobile communication device 10.

The position of the tube is not limited to the side walls of a mobile communication device. The tubes can be placed along the front side or back side of the mobile communication device. For example, if placed along the front side of the mobile communication device, the tube can provide a touch-screen function. Mobile communication devices such as smart phones typically detect a touch on the touch screen via one of various methods, including resistive systems, capacitive systems, surface acoustic wave systems, and the like. In a resistive system, the front glass screen is covered with a conductive layer and a resistive metallic layer, held together by spacers. An electrical current runs through the two layers. When a user touches the screen, the two layers make contact in that exact spot, changing the electrical field and allowing a determination of coordinates of that point of touch. In a capacitive system, a layer that stores electrical charge is placed on the glass panel of the monitor. When a user touches the screen with his or her finger, some of the charge is transferred to the user, so the charge on the capacitive layer decreases. This decrease is measured in circuits located at various locations (e.g., corners) of the screen. The controller then calculates the location of the touch based on the relative differences in charge at each circuit. In a surface acoustic wave system, two transducers (one receiving and one sending) are placed along the x and y axes of the glass plate, along with reflectors that reflect an electrical signal sent from one transducer to the other. The receiving transducer can determine if the wave has been disturbed by a touch event at any instant, and can locate the disturbance accordingly.

Figure 8:
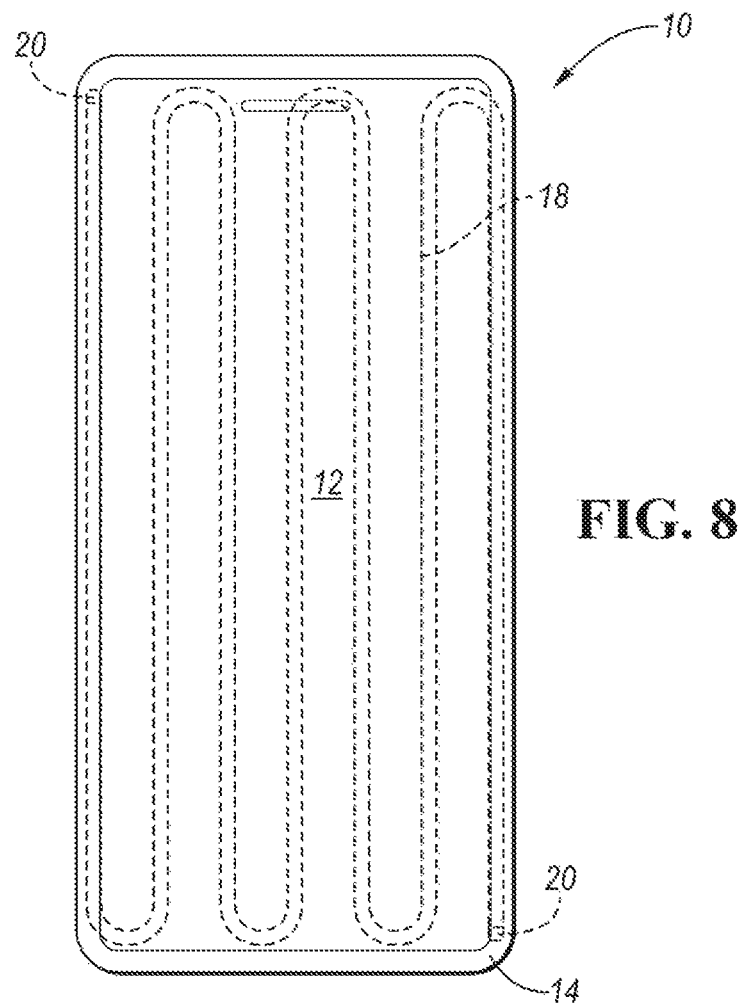
FIG. 8 illustrates a top plan view of a mobile communication device having a serpentine-shaped pressure tube in communication with a display surface of the mobile communication device, according to one embodiment.

The pressure chamber such as a pressure tube 18 can provide an additional or alternative touch screen system. FIG. 8 illustrates an embodiment of the mobile communication device 10 in which the pressure tube 18 extends in a serpentine shape beneath the front surface 12 of the mobile communication device 10. While one singular tube 18 is shown in the serpentine shape, it should be understood that more than one tube 18 can be utilized covering a large portion beneath the front surface 12. This allows a pressure wave created by a force exerted anywhere on the front surface 12 of the mobile communication device 10 to be detected by the pressure sensors 20, and the location of the force can be determined according to the teachings above. While only two pressure sensors 20 are shown in this embodiment, it should be understood that more than two pressure sensors can be utilized to allow for multiple pressure wave velocity measurements and locational determinations to be made, averaging the results and filtering out the noise for improved accuracy.

While FIG. 8 illustrates the tube 18, it should be understood that a chamber of any shape or configuration can be used. For example, a chamber can be placed beneath the front surface 12, extending continuously across the substantial majority (or entirety) of the area beneath the front surface 12. Pressure sensors 20 can be disbursed throughout the area beneath the front surface 12.

In any of the embodiments herein, the chamber or pressure tube 18 can be pre-pressured with the fluid medium 22 to a certain level above atmospheric pressure. This achieves a higher sensitivity with the pressure sensors 20. Likewise, the structures and textures of the inner surface of the tube 18 can be modified to tune the path of the pressure waves and the duration of time it takes for the waves to go from one location to another location. The detection algorithms and systems in place with the controller can take these additional influences into account during the determination of the external-force event.

The material of the chamber or tube 18 can also be tuned such that the pressure waves can travel to the sensors 20 with the highest quality of signal. When the material of the chamber or tube 18 interferes with the signals from the pressure wave reflection, the algorithm can be calibrated to compensate for the interference of the signal.

Figure 9:
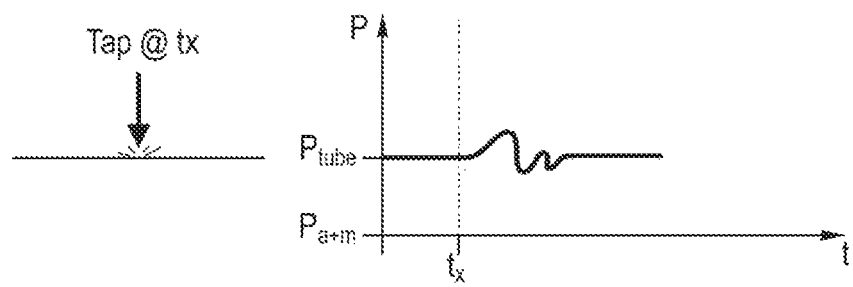
FIG. 9 is a graphical illustration of pressure in the fluid medium in the pressure tube after a tap-force on the mobile communication device, according to an embodiment.

The system described herein can also differentiate between a short force (e.g., a tap of a finger) and a longer force (e.g., pressing and holding of the finger). FIG. 9 illustrates a representation of a short force applied to the mobile communication device 10, such as a tap of the finger. The pressure within the tube $P_{tube}$ is initially pre-pressurized with pressure at, for example, a value that exceeds atmospheric pressure, $P_{atm}$. In other embodiments, $P_{tube}$ is pre-pressurized with pressure below atmospheric pressure, and the mechanical spring constant of the material of the tube will inhibit the tube from collapsing. A press on a region of the frame 14 where the tube 18 is located creates a pressure shockwave at time $t_x$. Shortly thereafter, the shockwave stabilizes and returns to the baseline pressure of the tube $P_{tube}$. In such a circumstance, the controller can infer that the user has tapped the mobile device.

Figure 10:
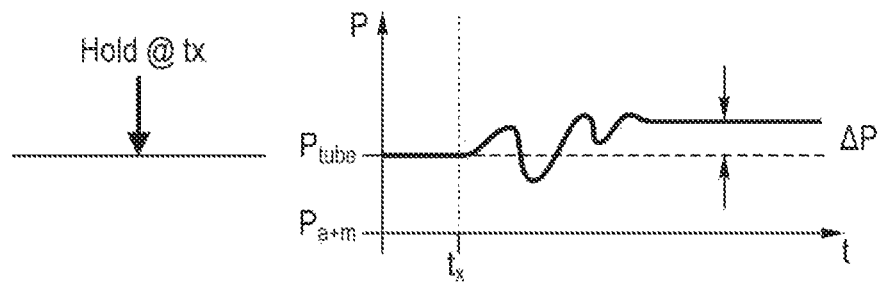
FIG. 10 is a graphical illustration of pressure in the fluid medium in the pressure tube after a hold-force on the mobile communication device, according to an embodiment.

FIG. 10 illustrates a representation of a longer force applied to the mobile communication device 10, such as a tap and hold of the finger. At time $t_x$, a first pressure wave arrives at the pressure sensors. Afterwards, the pressure value stabilizes at a value that exceeds the baseline pressure by a difference of ΔP. Once the sensors and controller determine that the pressure has stabilized by a difference of ΔP for a threshold time (e.g., 0.3 seconds), the controller will classify this event as a touch-and-hold event where the user has touched and held his or her finger on the mobile device 10.

By differentiating between a tap (FIG. 9) and a touch-and-hold (FIG. 10), the controller can command different actions accordingly. For example, if a user has tapped the mobile device 10 in a region designated for increasing the volume, the controller may correspondingly increase the volume by a single increment and wait for further pressure sensor data. Alternatively, if the user has touched-and-held the mobile device in the region designated for increasing the volume, the controller may correspondingly increase the volume by multiple increments until the user's finger is removed and the pressure in the tube 18 stabilizes at its baseline pressure (e.g., ΔP is zero).

In either the situation of a tap (FIG. 9) or a touch-and-hold (FIG. 10), it may be beneficial to filter out small amounts of detected force that may not be intended to cause a corresponding action in the mobile communication device 10. For example, if a user merely grasps the mobile communication device 10 by applying pressure to the frame, it may not be desirable to incidentally cause an action such as a decrease in volume. Therefore, a force threshold may be set, and the exceeding of this force threshold in the fluid medium causes the controller to issue the appropriate command.

A temperature sensor can also be included to compensate for use in hot or cold environments. The temperature sensor may be located in the mobile communication device (e.g., in fluid communication with the fluid medium in the tube) and can either measure the temperature of the environment proximate the mobile phone, the temperature of the fluid medium, the temperature of the pressure sensor, etc. In response to the temperature that is determined by the temperature sensor, the processor in communication with the temperature sensor and pressure sensor may change the threshold of activation of a signal responsive to pressure in the tube. For example, if the temperature of the fluid medium in the is cold and the fluid medium becomes denser and loses elasticity to move, the gel may require additional force to activate a command at the pressure sensor (based on the original pressure threshold). To account for this, the processor may utilize the temperature sensor to derive a temperature reading and thus update the threshold in the event the sensor identifies a colder temperature (e.g., below a threshold temperature). Thus, the pressure threshold may be altered and compensated to require less pressure to activate a signal (e.g., volume up/down, mute on/off, power on/off, reset, etc.) in a colder environment than in a warm environment. On the other hand, if the temperature of the fluid medium is warmer (e.g., exceeds a threshold temperature) and the fluid medium becomes thinner and more elastic and thus more sensitive to movement and force, the fluid medium may then require less force to activate a command at the pressure sensor (based on the original pressure threshold). Thus, a hotter temperature may make the pressure sensor more sensitive. In one embodiment, the processor may utilize the temperature reading from the temperature sensor to update the threshold if it senses a warmer temperature. Thus, the threshold may require more pressure to activate a signal (e.g., volume up/down, mute on/off, power on/off, reset, etc.) in a warmer environment than in a colder environment due to sensitivity. Thus, false activations may be prevented through use of the temperature sensor in a warmer environment.

Figure 11:
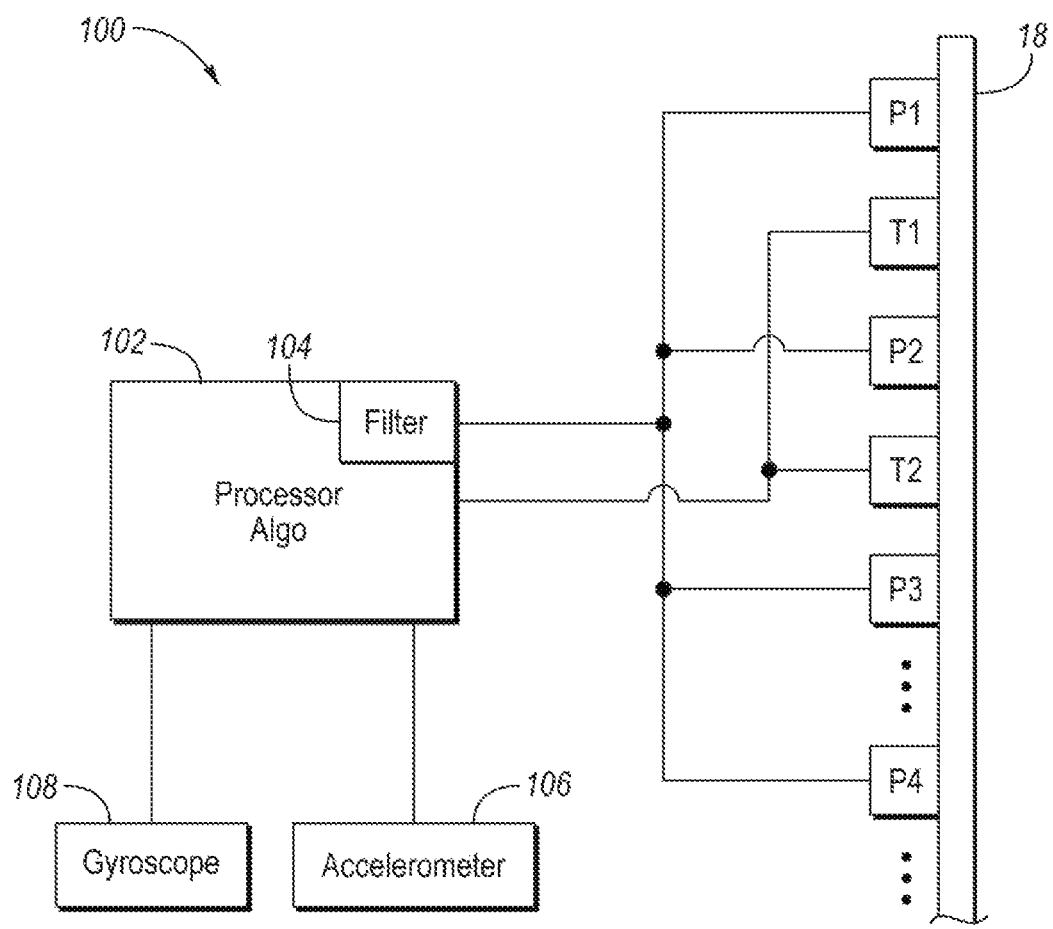
FIG. 11 illustrates a schematic of a control system according to one embodiment.

FIG. 11 illustrates a schematic of a control system 100 according to one embodiment. The control system 100 includes a controller described above, which may be or include a processor 102 configured to perform one or more algorithms for determining the location of the external force exerted on the frame 14 of the mobile communication device 10. The processor 102 may be the main processor for the mobile communication device 10, or another processor dedicated for force location determination.

The system 100 includes various pressure sensors (P1, P2, . . . , PN) and various temperature sensors (T1, T2, . . . , TN) located along or in communication with the pressure chamber such as pressure tube 18. The pressure sensors output signals to the processor 102 that indicate the fluid pressure exerted on the sensor itself. The pressure sensor signals may be filtered by filter 104 for removing noise, etc. The filter 104 may be adjustable depending on the material of the tube 18, the makeup of the fluid medium 22, and other factors. The temperature sensors output signals to the processor 102 that indicate the temperature of the fluid.

The processor 102 is programmed or configured to detect a force event using data from the pressure sensors, as explained above. Based on an increase in the pressure indicating a tap or a touch-and-hold event, the processor 102 determines location of the force event. The location of the force can be determined based on the time difference between the pressure wave reaching a first pressure sensor and the pressure wave reaching a second pressure sensor, for example.

The processor can filter out or not classify force events even if the pressure in the tube has increased. For example, a sudden movement of the phone may change the pressure in the tube without any touch occurring on the frame 14. The processor can remove these events based on programmed code, machine learning, etc.

Additional movement sensors, such as an accelerometer 106 and/or a gyroscope 108 can also be coupled to the processor 102. These movement sensors can detect such a movement of the mobile communication device 10 that would indicate whether the mobile communication device 10 is in use, held upright, or rather laying on an underlying surface such as a table. If no movement is detected, the system 100 can enter a low power sleep state. Any kind of movement can be measured using the accelerometer and wake up the system 100, readying the pressure sensors 20 for detection of fluid pressure changes in the tube 18. Any additional movement during operation can be detected and motion artifacts can be removed from the pressure sensor signals.

The mobile communication device 10 and system 100 explained herein enables user-customization of activation zones on the mobile communication device 10. The user can set (e.g., through an application on the mobile communication device) the desired location of the various activation zones that will cause a corresponding action. For example, the user can designate a first region of the frame 14 that, when pressure is applied, will cause the controller to command the volume to increase. The user can also designate a second region of the frame 14 that, when pressure is applied thereto, will cause the controller to command the screen to turn off. Thus, the user is given the ability to fully alter and customize his or her desired location for virtual "buttons" around the mobile communication device 10.

Additional pressure sensors may be utilized in combination with or alternative to the pressure tube described herein. An example of this is provided in patent application titled "SYSTEM AND METHOD FOR UTILIZING PRESSURE SENSORS IN AN ELECTRIC DEVICE," Ser. No. 16/718, 012, filed on the same day as this application, which is hereby incorporated by reference in its entirety.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system of determining a location of a force exerted on a mobile communication device, the system comprising:
    a tube containing a fluid medium, the tube configured to attach to a mobile communication device about at least a portion of a perimeter of a frame of the mobile communication device;
    a first pressure sensor disposed along the tube and configured to detect pressure in the fluid medium;
    a second pressure sensor disposed along the tube and configured to detect pressure in the fluid medium; and
    a processor coupled to the first and second pressure sensors and configured to determine a location of a force exerted on the tube based on a time between the first and second pressure sensors detecting a pressure increase in the fluid medium.

2. The system of claim 1, wherein the processor is configured to issue a command based on the determined location of the force exerted on the tube.

3. The system of claim 1, wherein the processor is configured to issue a first command based on the determined location being at a first location, and issue a second command based on the determined location being at a second location.

4. The system of claim 3, wherein the first command is a command to change an audio volume of the mobile communication device, and the second command is a command to turn a screen of the mobile communication device on or off.

5. The system of claim 1, further comprising a temperature sensor coupled to the processor and configured to detect a temperature of the fluid medium, wherein the processor is configured to compensate the time between the first and second pressure sensors detecting a pressure increase based on the temperature of the fluid medium.

6. The system of claim 1, wherein the tube is an elongated tube configured to wrap around a corner of the frame of the mobile communication device.

7. The system of claim 1, wherein the tube includes a plurality of outer walls including a first outer wall that faces an edge of the mobile communication device that receives the force, wherein the first outer wall is more flexible than the other outer walls.

8. The system of claim 1, wherein the first and second pressure sensors are configured to detect a baseline pressure when the force is not exerted on the tube, and wherein the processor is configured to issue a command in response to the pressure increase in the fluid medium followed by a maintained pressure in the fluid medium exceeding the baseline pressure.

9. A mobile communication device comprising:
    a frame;
    a sealed chamber disposed within the frame, the chamber containing a fluid medium configured to transfer pressure through the chamber in response to an external force exerted on the chamber;
    first and second pressure sensors disposed along the chamber and configured to detect fluid pressure in the fluid medium; and
    a processor configured to determine a location of the external force exerted on the chamber based on a time between (i) the first pressure sensor detecting an increase in the fluid pressure and (ii) the second pressure sensor detecting the increase in the fluid pressure.

10. The mobile communication device of claim 9, wherein the mobile communication device does not include physical buttons thereon.

11. The mobile communication device of claim 9, wherein the chamber is an elongated tube extending about at least a portion of a perimeter of the mobile communication device.

12. The mobile communication device of claim 9, wherein the frame defines a sidewall of the mobile communication device.

13. The mobile communication device of claim 12, wherein the sidewall defines a first thickness in a first region of the frame that overlaps the chamber, and a second thickness in a second region of the frame that does not overlap the chamber, wherein the second thickness exceeds the first thickness.

14. The mobile communication device of claim 9, wherein the fluid is a liquid or a gas.

15. The mobile communication device of claim 9, wherein the processor is configured to issue a first command based on the determined location being at a first location, and issue a second command based on the determined location being at a second location.

16. The mobile communication device of claim 9, wherein the location is a first location, and the external force is a first external force, and wherein the processor is further configured to:
    determine a second location of a second external force exerted on the chamber based on a second time between (i) the first pressure sensor detecting a second increase in the fluid pressure and (ii) the second pressure sensor detecting the second increase in the fluid pressure;
    issue a first command in response to the determined first location of the first external force; and issue a second command different than the first command in response to the determined second location of the second external force that is different than the first location.

17. The mobile communication device of claim 16, wherein the first command is a command to change an audio volume of the mobile communication device, and the second command is a command to turn a screen of the mobile communication device on or off.

18. A system of determining a location of a force exerted on a mobile communication device, the system comprising:
   a tube encapsulating a fluid medium, the tube configured to attach to a frame of a mobile communication device; and
   first and second pressure sensors disposed along the tube and configured to detect pressure in the fluid medium, wherein the first and second pressure sensors are operable to output respective first and second pressure signals indicative of pressure in the fluid medium, and wherein a difference in time between pressure increases in the first and second pressure signals indicates a location where a force is exerted on the tube.

19. The system of claim 18, further comprising a processor coupled to the first and second pressure sensors and configured to determine the location of the force exerted on the tube based on the difference in time between pressure increases in the first and second pressure signals.

20. The system of claim 18, wherein the tube is an elongated tube attached to a side edge of the frame.

\* \* \* \* \*